US012607762B2

(12) United States Patent
Edgar et al.

(10) Patent No.: US 12,607,762 B2
(45) Date of Patent: Apr. 21, 2026

(54) VEHICLE PROXIMITY SENSOR SYSTEM

(71) Applicant: Three Smith Group Limited, West Yorkshire (GB)

(72) Inventors: David Edgar, West Yorkshire (GB); Milos Bozic, West Yorkshire (GB); Matthew Wroe, West Yorkshire (GB)

( * ) Notice: Subject to any disclaimer, the term of this patent is extended or adjusted under 35 U.S.C. 154(b) by 0 days.

(21) Appl. No.: 18/289,676

(22) PCT Filed: Feb. 10, 2022

(86) PCT No.: PCT/GB2022/050360
§ 371 (c)(1),
(2) Date: Nov. 6, 2023

(87) PCT Pub. No.: WO2022/234242
PCT Pub. Date: Nov. 10, 2022

(65) Prior Publication Data
US 2024/0255670 A1 Aug. 1, 2024

(30) Foreign Application Priority Data
May 7, 2021 (GB) ..................................... 2106513

(51) Int. Cl.
*G08G 1/042* (2006.01)
*G01V 3/08* (2006.01)
*G08G 1/01* (2006.01)

(52) U.S. Cl.
CPC ............. *G01V 3/081* (2013.01); *G08G 1/012* (2013.01); *G08G 1/042* (2013.01)

(58) Field of Classification Search
None
See application file for complete search history.

(56) References Cited

U.S. PATENT DOCUMENTS

| | | | |
|---|---|---|---|
| 6,113,037 A | 9/2000 | Pace | |
| 2006/0109142 A1* | 5/2006 | Ponert | G01V 3/08 |
| | | | 340/941 |
| 2007/0124076 A1 | 5/2007 | Ockerse et al. | |
| 2007/0288166 A1 | 12/2007 | Ockerse et al. | |

(Continued)

FOREIGN PATENT DOCUMENTS

| | | | |
|---|---|---|---|
| JP | 2002-287825 A | 10/2002 | |
| JP | 2005-001873 A | 1/2005 | |

(Continued)

OTHER PUBLICATIONS

Opposition Brief from related Chilean Application No. 202303291 issued by the Chilean Patent Office on Aug. 21, 2024; 17 pgs. including English translation.

(Continued)

*Primary Examiner* — John F Mortell
(74) *Attorney, Agent, or Firm* — Mueting Raasch Group

(57) ABSTRACT

A vehicle proximity sensor system comprising: a magnetometer; and a controller configured to: receive a reference magnetic field signal from the magnetometer; receive a measurement magnetic field signal from the magnetometer; determine magnetic field displacement data based on the measurement magnetic field signal and the reference magnetic field signal; and signal the presence of a vehicle based on the magnetic field displacement data.

20 Claims, 6 Drawing Sheets

(56)     References Cited

U.S. PATENT DOCUMENTS

| | | | |
|---|---|---|---|
| 2014/0021947 A1 | 1/2014 | Gmajnic | |
| 2014/0077961 A1 | 3/2014 | Frederick | |
| 2014/0239945 A1* | 8/2014 | Seabury ................. | G08G 1/042 |
| | | | 324/244 |
| 2018/0128932 A1 | 5/2018 | Frederick | |
| 2018/0151078 A1 | 5/2018 | Frederick | |
| 2019/0295416 A1* | 9/2019 | O'Callaghan .......... | G08G 1/143 |

FOREIGN PATENT DOCUMENTS

| | | | |
|---|---|---|---|
| JP | 2010-065402 A | 3/2010 | |
| JP | 2010-065403 A | 3/2010 | |
| JP | 2014-084601 A | 5/2014 | |
| JP | 2017-182655 A | 10/2017 | |
| JP | 2020-149554 A | 9/2020 | |

OTHER PUBLICATIONS

International Application No. PCT/GB2022/050360, filed Feb. 10, 2022, International Search Report and Written Opinion, issued Jun. 28, 2022, 14 pages.
United Kingdom Patent Application No. GB2106513.1, filed May 7, 2021; United Kingdom Search Report issued Sep. 22, 2021; 6 pages.
JP Office action for JP Application No. 2024-513559 issued by the Japanese Patent Office on Dec. 2, 2025; 11 pgs. including translation.

\* cited by examiner

VEHICLE PROXIMITY SENSOR SYSTEM

This application is the $371 U.S. National Stage of International Application No. PCT/GB2022/050360, filed Feb. 10, 2022, which claims the priority to European App. No. 2106513.1, filed May 7, 2021, the disclosures of which are incorporated by reference herein in their entireties.

FIELD

The present disclosure relates to a vehicle proximity sensor system and in particular a vehicle proximity sensor system comprising a magnetometer.

SUMMARY

According to a first aspect of the present disclosure there is provided a vehicle proximity sensor system comprising:
  a safety structure susceptible to vehicle collisions and comprising a magnetometer; and
  a controller configured to:
    receive a reference magnetic field signal from the magnetometer;
    receive a measurement magnetic field signal from the magnetometer;
    determine magnetic field displacement data based on the measurement magnetic field signal and the reference magnetic field signal; and
    signal the presence of a vehicle based on the magnetic field displacement data.

By using a magnetometer, the system can advantageously distinguish the presence of a vehicle from a non-vehicle object such as a pedestrian. In this way, the system does not signal the non-hazardous sole presence of pedestrians.

The controller may be configured to signal the presence of a vehicle having a ferromagnetic mass.

The controller may be configured to determine the magnetic field displacement data based on a difference or ratio between the measurement magnetic field and the reference magnetic field along one or more axes.

The magnetic field displacement data may comprise a magnetic field displacement data along one or more axes.

The controller may be configured to receive the reference magnetic field signal as a calibration reference magnetic field as part of a calibration routine.

The controller may be configured to signal the presence of a vehicle in response to the magnetic field displacement data exceeding one or more displacement thresholds.

The vehicle proximity sensor system may further comprise an alert signal generator. The controller may be configured to signal the presence of a vehicle by activating the alert signal generator.

The alert signal generator may comprise an audible signal generator and/or a visible signal generator.

The controller may be configured to signal the presence of a vehicle by transmitting a data signal to an external device.

The controller may be configured to receive a plurality of measurement magnetic field signals from the magnetometer over a time period and determine the magnetic field displacement data based on the plurality of magnetic field signals.

The controller may be configured to:
  determine one or more dynamic parameters of the vehicle based on the plurality of magnetic field displacement data; and
  signal the presence of a vehicle based on the one or more dynamic parameters.

The one or more dynamic parameters may comprise any of: a position, a speed, a velocity, an acceleration and/or a trajectory of the vehicle.

The controller may be configured to:
  determine a trajectory of the vehicle based on the plurality of magnetic field displacement data; and
  signal the presence of the vehicle if at least a portion of the trajectory of the vehicle falls within a threshold range of the proximity sensor.

The controller may be co-located with the magnetometer. The controller may be coupled to the magnetometer via a network. The controller may comprise a plurality of processors distributed between being co-located with the magnetometer or coupled to the magnetometer via the network.

The controller may be further configured to:
  receive trigger signalling from a trigger sensor indicating an object within a sensing range of the vehicle proximity sensor system;
  selectively activate the magnetometer based on the trigger signalling such that it provides the measurement magnetic field signal to the controller;
  determine the magnetic field displacement data; and
  determine that the object is a vehicle based on the magnetic field displacement data.

The vehicle proximity sensor system may comprise the trigger sensor.

The trigger sensor may comprise an optical sensor. The trigger sensor may comprise a mechanical sensor. The trigger sensor may comprise a vibration sensor or an impact sensor. The trigger sensor may comprise an accelerometer. The trigger sensor may comprise a receiver.

The trigger signalling may be received from the object.

The controller may be configured to enable a sleep mode of the vehicle proximity sensor when the magnetic field displacement is less than a sleep threshold.

The controller may be configured to receive a plurality of reference magnetic field signals from the magnetometer and determine the magnetic field displacement based on the plurality of reference magnetic field signals.

The vehicle proximity sensor system may be associated with a magnetised structure. The controller may be further configured to determine a condition of the magnetised structure based on the plurality of reference magnetic field signals.

At least the magnetometer may be positioned within a safety structure. The safety structure may comprise any of: a safety barrier, a safety bollard, a safety rail, a post for a safety rail, a collision sensor or a component part thereof.

The vehicle proximity sensor system may further comprise:
  a plurality of magnetometers, wherein in each magnetometer is coupled to a corresponding transceiver; and
  a server configured to communicate with each of the plurality of magnetometers via the corresponding transceiver.

The server may comprise a controller.

The vehicle proximity sensor system may further comprise a plurality of controllers each configured to receive reference and measurement magnetic fields from a corresponding magnetometer.

The safety structure may comprise a structure for protecting or segregating assets or pedestrians from vehicles. The safety structure may comprise a structure for protecting or segregating pedestrians from hazard areas.

The safety structure may comprise any of: a safety barrier, a safety bollard, a safety rail, a post for a safety rail, a bumper, a collision sensor, racking, guards, machine guarding, machine fencing, a combination thereof or a component part thereof.

A safety structure comprising any of the vehicle proximity sensor systems disclosed herein. The safety structure may comprise any of: a safety barrier, a safety bollard, a safety rail, a post for a safety rail, a collision sensor or a component part thereof.

A network system comprising a server connected to a plurality of any of the vehicle proximity sensors systems disclosed herein and/or a plurality of any of the safety structures disclosed herein.

According to a further aspect of the present disclosure, there is provided a computer implemented method for sensing the proximity of a vehicle, comprising:

receiving a reference magnetic field signal from a magnetometer;

receiving a measurement magnetic field signal from the magnetometer;

determining magnetic field displacement data based on the measurement magnetic field signal and the reference magnetic field signal; and signalling the presence of a vehicle based on the magnetic field displacement data.

According to a further aspect of the present disclosure there is provided a vehicle proximity sensor system comprising:

a magnetometer; and a controller configured to:

receive a reference magnetic field signal from the magnetometer;

receive a measurement magnetic field signal from the magnetometer;

determine magnetic field displacement data based on the measurement magnetic field signal and the reference magnetic field signal; and signal the presence of a vehicle based on the magnetic field displacement data.

BRIEF DESCRIPTION OF THE DRAWINGS

One or more embodiments will now be described by way of example only with reference to the accompanying drawings in which.

DETAILED DESCRIPTION

Vehicle collisions can cause injury to persons, including the driver and pedestrians, and damage to structures and the vehicle itself. In a factory or warehouse environment, vehicles may be required to move within confined spaces and in close proximity to valuable goods and personnel. For example, in a warehouse, forklift trucks (FLTs) may pass between isles of racking or shelving that contain valuable stock. A FLT may have to perform tight turns and manoeuvres to load and unload stock from the racking. Even a skilled driver may accidently collide with racking causing damage and creating a potential safety hazard from the racking collapsing, particularly if the collision is not detected or goes unreported.

Collision sensors on racking can alleviate this risk by detecting and reporting collisions. However, collision sensors may generate many false alarms from non-damaging collisions resulting from a pedestrian brushing past the structure, for example.

A further hazard in a warehouse or factory environment is a collision between vehicle traffic and personnel. A driver or pedestrian may be distracted when trying to locate a particular item of stock and the prevalence of blind corners can further enhance the danger of a vehicle—pedestrian collision.

Proximity sensors can detect motion and alert users accordingly. However, proximity sensors may not distinguish between pedestrians and vehicles, and thus may create unnecessary alerts due to personnel passing on foot. Pedestrians may then experience alert fatigue and ignore the warning signal.

Similar hazards to those describe exist in other environments such as the airside of an airport terminal, a car park or a construction site among others. The vehicle proximity sensor disclosed herein may be suitable for use in any appropriate environment in which vehicle collisions present a safety hazard.

Figure 1:
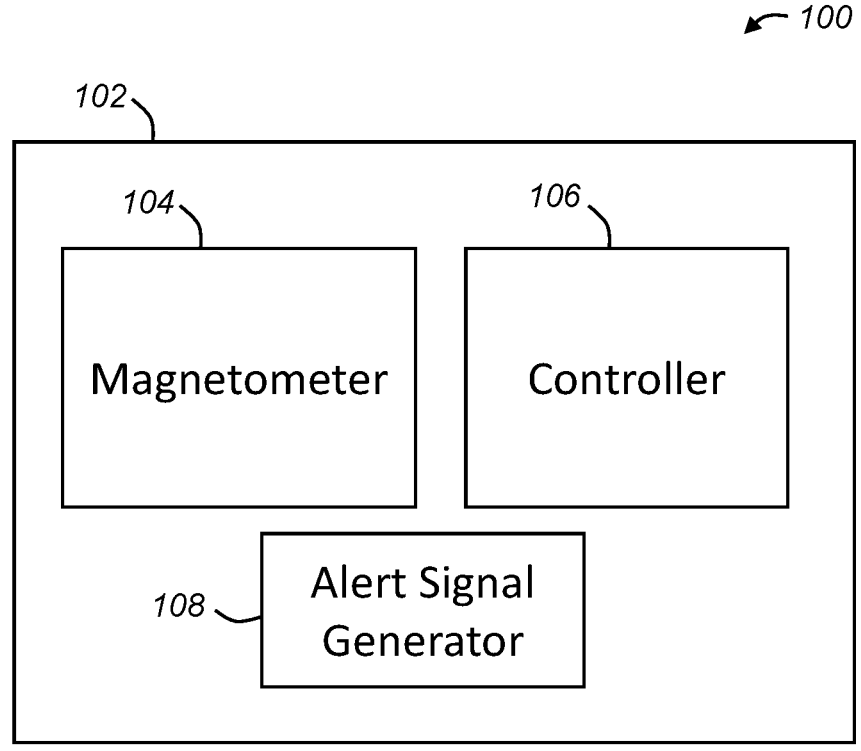
FIG. 1 illustrates a schematic overview of a vehicle proximity sensor system according to an embodiment of the disclosure.

FIG. 1 illustrates a schematic overview of a vehicle proximity sensor system 100 according to an embodiment of the present disclosure. The vehicle proximity sensor system 100 (referred to herein as the system 100) comprises a magnetometer 104 and a controller 106. The controller 106 is configured to receive magnetic field signals from the magnetometer 104. The magnetic field signals include: (i) a reference magnetic field signal providing a background or calibration reference magnetic field in the vicinity of the magnetometer at a first time; and (ii) a measurement magnetic field signal providing a magnetic field measurement in the vicinity of the magnetometer at a second time after the first time. The controller 106 determines magnetic field displacement data based on a difference between the measurement magnetic field signal and the reference magnetic field signal. The controller 106 can then signal the presence of a vehicle in the vicinity of the magnetometer if the magnetic field displacement data indicates a difference greater than a displacement threshold. In this example, the controller 106 can signal the presence of the vehicle using an alert signal generator 108.

Vehicles, particularly FLTs and heavy vehicles (HVs), typically have a substantial mass of ferromagnetic (or ferrous) material. As the vehicle moves, it disturbs the Earth's magnetic field. Therefore, as a vehicle moves close to the magnetometer 104, the magnetometer 104 can measure a change in magnetic field and determine the magnetic field displacement data.

By using a magnetometer, the system 100 can advantageously distinguish the presence of a vehicle from a non-vehicle object such as a pedestrian. In this way, the system does not signal the non-hazardous sole presence of pedestrians. As discussed below, examples of the system 100 can also advantageously determine a position and dynamic properties of the vehicle to further quantify the hazard.

The sensor system 100 may be associated with a structure susceptible to vehicle collisions. The structure may be a fixed structure, for example, the system 100 may be associated with posts, barriers, racking, walls, machine guarding, machine fencing etc within a warehouse environment. The system 100 may also be associated with bollards and barriers in an outdoor environment, such as a construction site, a car park or an airport. The system 100 may also be associated with a mobile structure susceptible to vehicle collisions, such as sliding racking, sliding barriers, autonomous guided vehicles, mobile robotics and other vehicles.

The structure comprises a safety structure susceptible to vehicle collision. The safety structure may comprise a structure for protecting or segregating assets or pedestrians from vehicles or a structure for protecting or segregating pedestrians from hazard areas. The safety structure may comprise any of: a safety barrier, a safety bollard, a safety rail, a post for a safety rail, a bumper, a collision sensor, racking, guards, machine guarding, machine fencing, a combination thereof or a component part thereof.

In some examples, the safety structure may comprise a polymer safety structure. Polymer safety structures (e.g. polyurethane safety structures) can provide robust protective safety structures for warehouse and factory environments and can include safety barriers, safety bollards, safety rails, posts, bumpers, racking, guards, machine guarding, machine fencing or any other structure for protecting or segregating pedestrians and/or assets from vehicle collisions or for protecting or segregating pedestrians from hazard areas. The system 100 can advantageously have an improved performance with polymer safety structures as the polymer safety structures provide a reduced magnetic field interference relative to metallic safety structures which may affect the magnetic field signal of the vehicle. In other examples, the safety structure may comprise a metallic or composite safety structure.

The system 100 may comprise a memory and the controller 106 may store at least one material property of the safety structure in the memory. For example, the controller 106 may store the magnetic permeability of the safety structure material. The controller 106 may determine one or more parameters related to the presence of the vehicle based on the material property. For example, as discussed below, the controller 106 may determine a distance to the vehicle and/or dynamic properties of the vehicle. The controller 106 may scale or calculate the distance and/or one or more dynamic properties of the vehicle based on the stored material property of the safety structure. In this way, the system 100 can compensate for different material types of the safety structure having different responses to the magnetic field disturbance provided by the vehicle and the resultant differing signals detected by the magnetometer. The relationship between the at least one material property, the vehicle parameters and the detected magnetic field signals may be determined as part of a calibration routine and may be stored as an algorithm.

In some examples, the controller 106 may be located local to the magnetometer 104 in a housing 102. The housing 102 may provide the system 100 as a self-contained unit with the housing 102 being attachable to the structure for monitoring. In other examples, the system 100 may be integrated into the structure or into a sub-component of the structure, for example integrated into a safety post or a cap for a safety post. The housing 102 (or safety structure) may have one or more input controls (not shown). For example, the one or more input controls may include one or more function buttons, a touchscreen, switches etc. The controller 106 may be responsive to activation of the one or more input controls to cause the magnetometer 104 to provide a reference magnetic field or perform a calibration routine (as described below) and/or reset the system 100, for example, by disabling the alert signal generator 108.

In some examples, the controller 106 may be located remotely from the magnetometer, for example outside the housing 102 and/or on a server. In such examples, the controller 106 may be coupled to the magnetometer 104 wirelessly and/or via a network. In some examples, the controller 106 may comprise a plurality of processors with one or more processors located locally to the magnetometer 104 (for example in the housing 102) and one or more processors located remotely from the magnetometer 104 (for example outside the housing 102 or on a server). In other words, any functionality of the controller 106 described herein may be performed locally to and/or remotely from the magnetometer. The system 100 and/or controller 106 may include a transceiver for communicating with any remote processing device, such as a remote controller 106 or a server.

The controller 106 may receive the reference magnetic field signal from the magnetometer 104 as a calibration reference magnetic field as part of a calibration routine. The calibration routine may be performed by the controller 106 at any time including: a time of manufacture, a time of installation, a time of service, a time of relocation and/or periodically during use, for example according to a schedule, or otherwise on demand. As an example, the controller 106 may capture a reference magnetic field once a day at a time when it is known that no vehicles are present (for example at night). The reference magnetic field signal may comprise an average of a plurality of magnetic field signals captured over a period of time when no vehicles are present. In this way, the background magnetic field can be periodically measured to provide a reference against any background changes that might occur that are not related to FLT/HV (heavy vehicle) movement. The reference magnetic field signal may comprise the earth's magnetic field signal and any static magnetic objects in the vicinity of the system. Therefore, the reference magnetic field signal may vary depending on the location of the system 100. Therefore, a new reference magnetic field signal may be received as part of a calibration routine if the system 100 is relocated to a new location.

The magnetic field signals may comprise magnetic field measurements along one or more coordinate axes or as an absolute magnitude value with no axial resolution. The controller 106 may determine the magnetic field displacement data, ΔB, based on a difference or ratio between the measurement magnetic field, $B^{meas}$, and the reference magnetic field, $B^{ref}$, along the one or more axes. For example, the magnetic field displacement data may take the form:

$$\Delta B_{x,y,z} = B^{meas}_{x,y,z} - B^{ref}_{x,y,z}$$

Or alternatively:

$$\Delta B_{x,y,z} = \frac{B^{meas}_{x,y,z}}{B^{ref}_{x,y,z}}$$

The controller 106 may compare, the magnetic field displacement data, ΔB, to one or more displacement thresholds. For example, the controller 106 may compare the magnitude of the magnetic field displacement data, ΔB, to an absolute displacement threshold. Alternatively, or in addition, the controller 106 may compare the value of the magnetic field displacement data along each axis to a corresponding axial displacement threshold. By employing one or more thresholds, low field disturbances that may be caused by metallic objects with less ferrous mass, such as a trolley, may be discounted.

The controller 106 may determine a position of the vehicle or distance to the vehicle based on the magnetic field displacement data, ΔB. In some examples, the magnetic properties of the vehicle may be predetermined. For example, in a warehouse setting, forklift trucks each having substantially the same mass of ferromagnetic material may be the only vehicle type for detection. The controller 106 may be preconfigured or programmed with a conversion factor for converting a value of the magnetic field displacement in one or more axes with a corresponding distance to the forklift truck along the one or more axes. In other examples, the controller 106 may receive an identification signal from the vehicle and identify the magnetic properties or ferromagnetic mass of the vehicle based on the identification signal. The controller 106 can then determine a position of the vehicle or distance to the vehicle based on the magnetic field displacement data and the identification signal.

In some examples, the controller 106 may receive a plurality of measurement magnetic field signals from the magnetometer 104 over a time period, for example a number of seconds. The controller 106 may determine time dependent magnetic field displacement data, ΔB(t), based on a difference (or ratio) between each of the plurality of measurement magnetic field signals, $B^{meas}$(t), and the reference magnetic field signal, $B^{ref}$.

The controller 106 may signal the presence of the vehicle based on the time-dependent magnetic field displacement data, ΔB(t). In addition, the controller may be able to determine dynamic parameters related to the vehicle based on the time-dependent displacement data, ΔB(t). For example, the controller 106 may determine a direction of travel based on whether the rate of change of the time-dependent displacement data, ΔB(t), is less than or greater than zero. Where a rate of change of the time-dependent displacement data, ΔB(t) that is greater than zero represents the vehicle getting closer to the magnetometer 104, and a rate of change of the time-dependent displacement data, ΔB(t) that is less than zero represents the vehicle getting further away from the magnetometer 104.

The controller 106 may also determine one or more dynamic parameters in the form of a speed, velocity, acceleration and or trajectory of the vehicle based on the time-dependent displacement data, ΔB(t). For example, analogous to the distance measurement above, the controller 106 may determine velocity of a vehicle based on a rate of change of the magnetic displacement data, dΔB(t)/dt, and either predetermined magnetic properties of the vehicle or an information signal containing the magnetic properties, received from the vehicle. The controller 106 may also determine the distance, as described above, over a period of time and determine the velocity as a rate of change of the distance measurement. Similarly, the controller 106 may determine the acceleration as a rate of change of the velocity. The controller 106 may determine the trajectory as a simple position-velocity vector based on a determined position and determined velocity of the vehicle. The controller 106 may also determine the trajectory based on the acceleration of the vehicle by applying Newtonian mechanics. The controller 106 may determine any of the described dynamic parameters for one or more axes and/or for an absolute magnitude of the displacement.

By monitoring the magnetic field displacement data, the system monitors the magnetic field in the vicinity of the magnetometer 104. The controller 106 can analyse the field strength change in each direction to determine the presence of the vehicle. The controller 106 can analyse the value of the displacement and the rate of change in the magnetic field displacement data to determine a distance to the vehicle and/or a vehicle speed.

In some examples, the system 100 may further comprise an alert signal generator 108 and the controller 106 may signal the presence of a vehicle by activating the alert signal generator 108. The alert signal generator 108 may comprise an audible signal generator, such as a siren, or a visible signal generator such as a (flashing) light or a display screen displaying warning messages. In this way, the alert signal generator 108 can alert the driver of the vehicle (or pedestrians) to the proximity of the vehicle to the sensor system and the associated susceptible structure. In addition, if the sensor system is placed at the corner of racking or shelving in a warehouse, the alert signal generator can alert users (such as pedestrians) to the presence of a vehicle that may not be visible to the user.

The controller 106 may control the alert signal generator 108 based on the position of the vehicle and/or one or more of the dynamic parameters. For example, if the controller 106 determines a speed of the vehicle to be greater than a speed threshold, the controller may control the alert signal generator to generate a warning signal, such as a warning light, a warning sound or a warning message (e.g. "SLOW DOWN") on the display screen. As a further example, if the controller 106 determines that a trajectory of the vehicle falls within an alert range of the system 100, the controller may control the alert signal generator to generate the alert signal. The alert signal may be different to, for example more intense than, the warning signal.

The alert signal generator 108 may comprise a transmitter configured to transmit an alert signal to an external device. For example, the transmitter may transmit an alert signal to the vehicle to activate an alarm on the vehicle to alert the driver. The transmitter may transmit the alert signal to a remote server to capture data relating to the presence of the vehicle. For example, the alert signal may comprise a data signal including any of the magnetic field sensor signals, the magnetic field displacement data and/or one or more of the dynamic vehicle parameters. In this way, data can be captured for the sensor system 100 for indicating how many collisions and/or near misses the structure associated with the system is exposed to, for example, on a daily or weekly basis.

In the illustrated example, the alert signal generator 108 is shown within the housing 102. In other examples, the alert signal generator 108 may be outside the housing and may communicate with the controller via wired or wireless means. For example, an alert signal generator may comprise an audible or visible signal generator located on a wall close to the sensor system.

The system 100 may include a power source (not shown). If the system is associated with a fixed structure, the power source may comprise a battery. Magnetometers can have a high power consumption and consume a non-negligible current. Therefore, in one or more examples, the system 100 may be configured to operate in a sleep mode or idle mode. The system 100 may enter a sleep mode after a predetermined period during which the magnetic field displacement data has not exceeded any displacement thresholds or a sleep threshold. In the sleep mode, the magnetometer 104 may be disabled such that it does not consume any power (or only a negligible amount). In the sleep mode, the controller 106 may also operate in a reduced state. For example, the controller 106 may only perform essential functions such as listening for trigger signalling to wake the system from the sleep mode. In this way, the system 100 operates in a sleep mode in which battery power is conserved.

The system 100 (or controller 106) may receive trigger signalling to wake the system 100 from the sleep mode. The system 100 may receive the trigger signalling from a trigger sensor indicating the presence of an object within a sensing range of the proximity sensor. The controller 106 may activate the magnetometer 104 in response to the trigger signalling, such that the magnetometer 104 provides a measurement magnetic field signal to the controller 106. The controller 106 can then determine the corresponding magnetic field displacement data. The controller 106 may determine that the object is a vehicle based on the magnetic field displacement data (for example if the magnetic field displacement data is greater than one or more displacement thresholds). For example, if the magnetic field displacement data is greater than one or more displacement thresholds, the controller 106 may determine the object to be a vehicle, otherwise the controller 106 may determine the object to not be a vehicle (for example a pedestrian) and return the system 100 to the sleep mode. If the object is determined to be a vehicle, the system may maintain the magnetometer 104 in an active state until the magnetic field displacement data remains below one or more sleep thresholds for a predetermined period. This can ensure a full data capture of any vehicle detection events.

In some examples, the system 100 may further comprise the trigger sensor. The trigger sensor may be a low-power device that can remain active during the sleep mode. For example, the system 100 may comprise an optical sensor, a mechanical sensor or a receiver. An optical sensor may comprise a passive infrared (PIR) sensor that can detect motion of an object within a predefined radius. The controller may receive signals from the PIR sensor and activate the magnetometer when any movement takes place in the predefined radius.

A mechanical sensor may comprise a vibration sensor such as an accelerometer. The mechanical sensor may detect vibration resulting from motion of an object (such as a vehicle) or from a collision of an object with the system 100 or the structure associated with the system 100. The controller 100 can then activate the magnetometer 104 and determine if the source of the vibration or collision was a vehicle by comparing the magnetic field displacement data to one or more displacement thresholds. In this way, the system 100 can distinguish vibrations at the associated structure resulting from potentially damaging vehicle collisions from those arising from low-risk vibrations such as a pedestrian brushing past the structure. Therefore, the system 100 can reduce false alarms in a collision sensor system. In one or more examples, the system 100 may form part of a collision sensor system in which the system 100 can provide the dual functionality of: (i) alerting approaching vehicles of a collision risk; and (ii) determining if a detected vibration or collision is associated with a vehicle. The collision sensor system may then alert a user of a vehicle collision if a vehicle is detected.

In some examples, the system 100 may comprise a trigger sensor in the form of a receiver, for example an RF receiver. The RF receiver may receive trigger signalling from an RF transmitter of a vehicle. For example, in a warehouse setting, forklift trucks or other vehicles, may be fitted with an RF transmitter. When the vehicle approaches the system 100, the RF receiver may receive the trigger signalling from the RF transmitter of the vehicle. In response, the controller 106 may activate the magnetometer 106 such that it provides one or more measurement magnetic field signals as described above.

In one or more examples, the system 100 may be associated with a magnetised structure that is susceptible to collisions or damage. The structure may be inherently magnetic or may be magnetised by the application of magnetic elements, such as magnetic strips, magnetic plates etc. The controller 106 may receive a plurality of reference magnetic field signals according to a predetermined schedule, for example, once per hour, once per day, once per week etc. The controller 106 may determine a condition of the magnetised structure based on the plurality of reference magnetic field signals. For example, if the structure is damaged or disassembled, the (static) reference magnetic field signal will undergo a permanent change. The controller 106 may detect this change in the reference magnetic field signal and provide an associated output signal. For example, the controller 106 may activate the alert signal generator 108 or may transmit a data signal to a remote device such as a server or a mobile device. The data signal may indicate to a user that the magnetised structure should be inspected for damage or assembly condition.

The controller 106 may determine the condition of the magnetised structure based on a comparison of the magnitude of the difference in reference magnetic field signals to one or more condition thresholds. For example, the removal of a barrier from a barrier structure may result in a higher change in the reference magnetic field signal than if the barrier was damaged in a collision. Therefore, a disassembly threshold may be higher than a damage threshold.

The controller 106 may also determine the condition of the magnetised structure following detection of the presence of a vehicle. The controller 106 can distinguish a change in condition of the magnetised structure from a passing vehicle based on the permanent change to the received magnetic field signals. For a passing vehicle, the magnetic field displacement data will return to zero once the vehicle has passed. For damage to the magnetised structure caused by the vehicle, the magnetic field displacement data will not return to zero once the vehicle has driven away. Therefore, the controller may activate the alert signal generator as described above in response to the magnetic field displacement data persisting above a damage threshold.

Figures 2A, 2B:
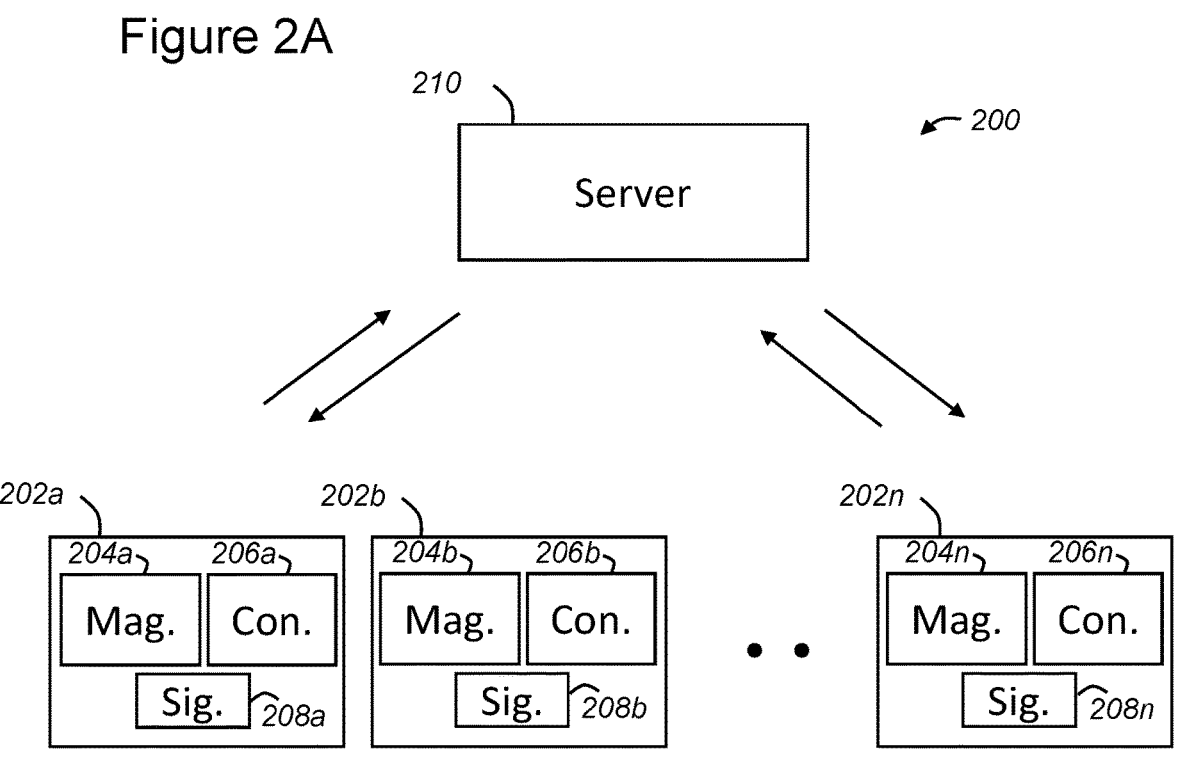
FIG. 2A illustrates a schematic overview of a further vehicle proximity sensor system according to an embodiment of the disclosure.
FIG. 2B illustrates a schematic overview of a yet further vehicle proximity sensor system according to an embodiment of the disclosure.

FIG. 2A illustrates a schematic overview of another vehicle proximity sensor system 200 according to an embodiment of the present disclosure. Features of FIG. 2A already described above in relation to FIG. 1 have been given corresponding reference numbers in the 200 series and will not necessarily be described again here.

The system 200 includes a plurality of sub-systems each associated with a structure for monitoring in an environment such as a warehouse. Each sub-system comprises a housing 202a, 202b, 202n including a magnetometer 204a, 204b, 204n and a controller 206a, 206b, 206n. Each sub-system also comprises a transceiver (not shown) that can communicate with a server 210. The server 210 may comprise a user interface or may communicate with other devices having a user interface such as a personal mobile device or a computer. In this way, the server 210 may collect data from each of the sub-systems to monitor vehicle collisions and near misses at each of the associated structures. The system 200 may determine one or more structures that are particularly vulnerable to collisions as structures that have a frequency of collisions and/or frequency of near misses greater than a corresponding safety threshold. In this way, a user can analyse the monitoring data and implement changes to the structural layout (such as rearranging the layout, implementing protective measures etc) to improve the safety of the environment.

In the example, of FIG. 2A each subsystem has a dedicated magnetometer 204a, 204b, 204n and a dedicated local controller 206a, 206b, 206c for implementing the controller functionality as described above in relation to FIG. 1.

Each subsystem also has a dedicated alert signal generator 208. In other examples, the subsystems may be communicatively coupled with a common alert signal generator. For example, two or more subsystems may be wirelessly coupled to the same audible or visible alert signal generator and/or to a common gateway that can perform some functionality of the controller 206 and/or pass information to and from the server.

FIG. 2B illustrates a schematic overview of a further vehicle proximity sensor system 200' according to an embodiment of the present disclosure. Features of FIG. 2B already described above in relation to FIG. 1 have been given corresponding reference numbers in the 200 series and will not necessarily be described again here.

In this example, the system 200' again includes a plurality of sub-systems each associated with a structure for monitoring in an environment such as a warehouse. However, the controller 206' is located at the server 210' and provides the functionality described above in relation to FIG. 1 for a plurality of the sub-systems. Each sub-system comprises a housing 202'a, 202'b, 202'n including a magnetometer 204'a, 204'b, 204'n and a transceiver 212'a, 212'b, 212'c. In this example, the sub-systems act as dumb devices in that the transceivers 212'a, 212'b, 212'n transmit signals from the corresponding magnetometer 204'a, 204'b, 204'n to the controller 206' for processing and receive signals from the controller 206' for activating a corresponding alert signal generator 208'a, 208'b, 208'n. In this way, the functionality of the controller 206' described in relation to FIG. 1 is implemented at the server 210'.

FIGS. 2A and 2B respectively describe examples in which the controller functionality is implemented local to the sub-system or on the server. It will be appreciated that in other examples any elements of the functionality of the controller described in relation to FIG. 1 may be performed local to the sub-system or remote from the sub-system on the server. For example, the system may process the magnetic data in a 2-step process. Firstly, a local processor may determine the magnetic field displacement data and determine vehicle proximity as described above. If a vehicle presence is determined, the magnetic data can either be further analysed locally and/or sent to the server by wireless means for storage and detailed analysis (such as the determination of dynamic parameters etc).

Figure 3:
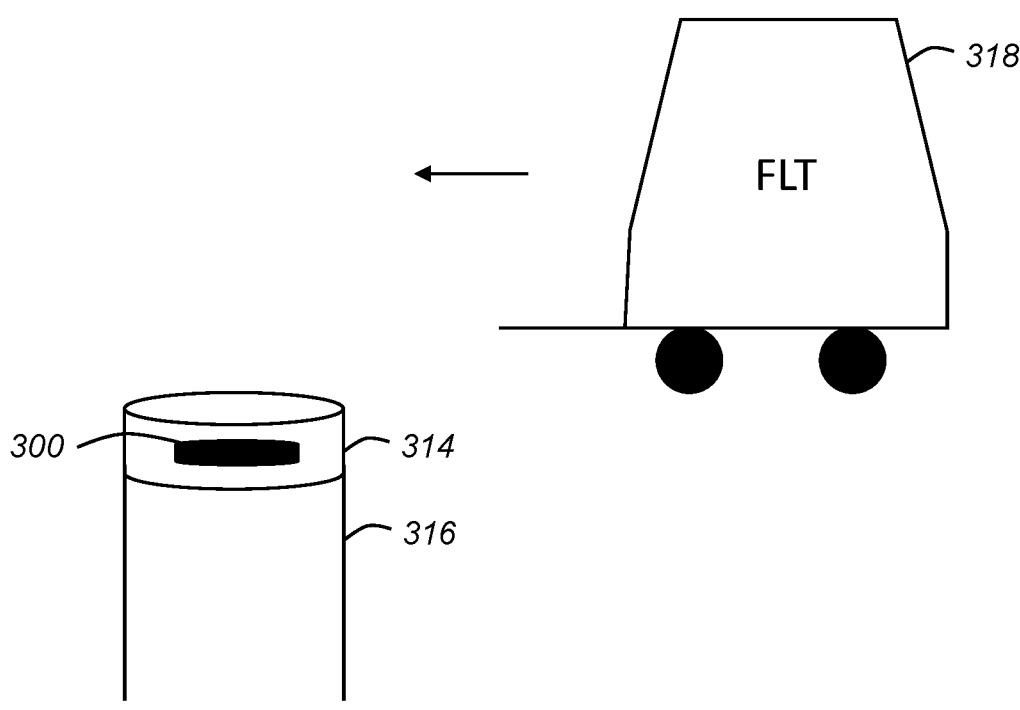
FIG. 3 illustrates an implementation of a vehicle proximity sensor system implemented in a safety structure according to an embodiment of the disclosure.

FIG. 3 illustrates an example implementation of the vehicle proximity sensor system according to an embodiment of the disclosure. In this example, a vehicle proximity sensor system 300 has been integrated into a cap 314 of a safety post 316. A vehicle 318 in the form of a forklift truck (FLT) is approaching the post 316 at a velocity of v m/s.

In this example, the vehicle proximity sensor system 300 includes a low-power trigger sensor. In this example, the low-power trigger sensor is a low-power proximity sensor in the form of a PIR sensor.

Initially the system 300 is in a sleep mode because a predetermined time period has elapsed without detection of a magnetic field displacement above a sleep threshold. In the sleep mode, the magnetometer is disabled and the low-power trigger sensor is active.

Once the vehicle 318 moves within a predetermined detection range of the PIR sensor, the PIR sensor (and controller) determines motion of an object and wakes or activates the magnetometer. In this example, the magnetometer measures the magnetic field along three cartesian axes, $B_x$, $B_y$, $B_z$, over a predetermined time period. The controller receives the magnetic field signals, $B_x(t)$, $B_y(t)$, $B_z(t)$, from the magnetometer and subtracts them from (or otherwise compares them with) the magnetic reference field signal, $B^{ref}$, to obtain the magnetic field displacement data, $\Delta B_{x,y,z}(t)$.

The controller determines that the object is a vehicle (FLT) if the magnetic field displacement data exceeds a displacement threshold. The controller can also determine a distance or proximity to the vehicle along each axis (or an absolute value) based on the value of the magnetic field displacement data along the corresponding axis or the absolute magnitude of the displacement data (root sum square). The controller may determine a distance to the vehicle based on a maximum value of the absolute magnetic displacement or the value along an axis. The controller may also determine a velocity of the vehicle based on a rate of change of the magnetic field displacement data.

Figure 4:
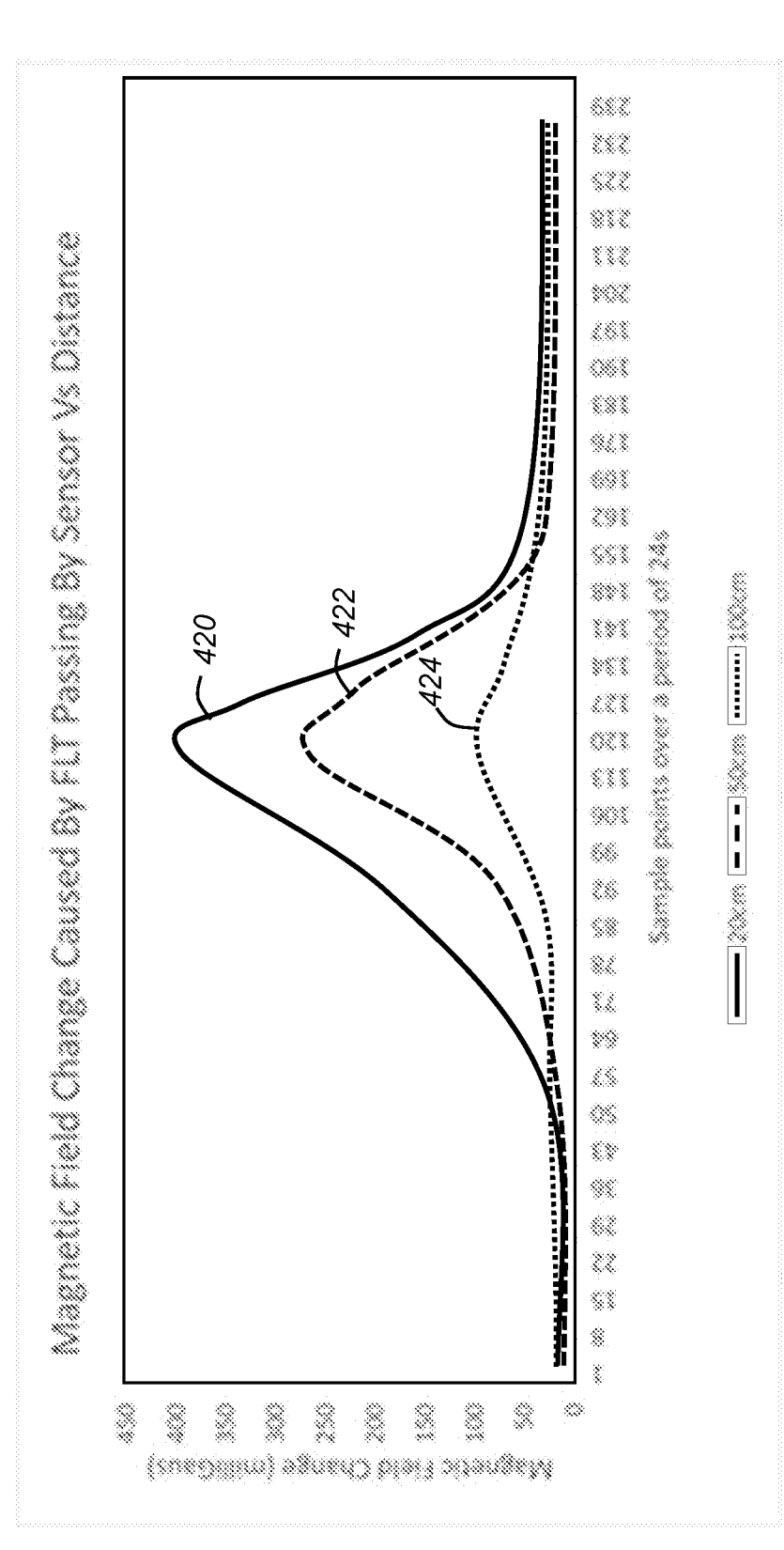
FIG. 4 shows magnetic field displacement data for a forklift truck passing a vehicle proximity sensor system according to an embodiment of the disclosure.

FIG. 4 illustrates the change in the absolute magnitude of the magnetic field displacement data over time as a FLT passes a vehicle proximity sensor system according to an embodiment of the invention. A first curve 420 shows the change in magnetic field as a FLT passes the system and comes within 20 cm of the magnetometer. A second curve 422 shows the change in magnetic field as the FLT passes the system and comes within 50 cm of the magnetometer. A third curve 424 shows the change in magnetic field as the FLT passes the system and comes within 100 cm of the magnetometer. Each curve shows an increase in magnetic field displacement as the FLT approaches to a closest proximity and then a decrease as the FLT moves away again.

Figure 5:
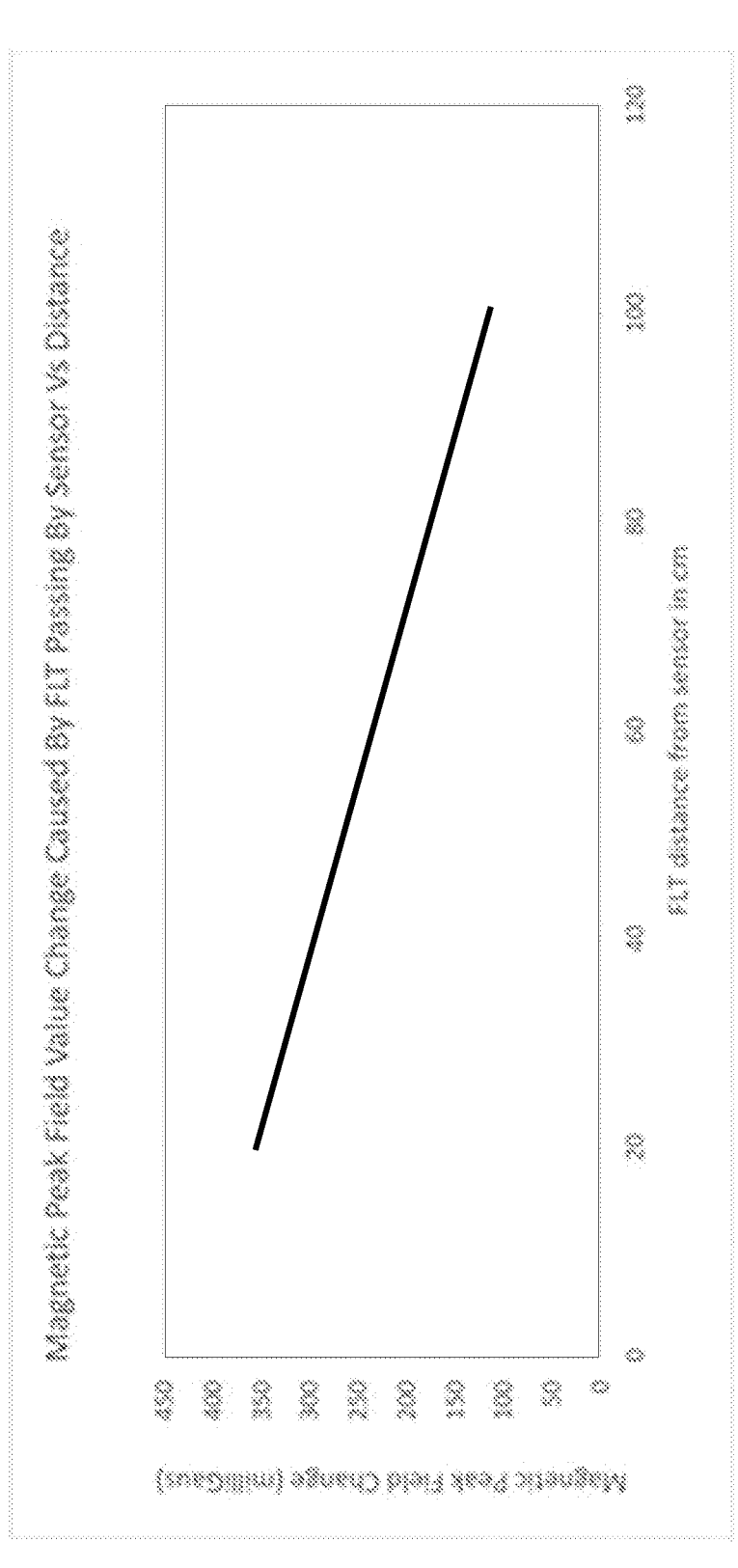
FIG. 5 shows the linear dependence of the magnetic field displacement data on distance to the forklift truck.

FIG. 5 illustrates the change in the maximum value of the magnetic field displacement as a function of the minimum distance at which the FLT passes. The plot corresponds to the peak values of the three curves from FIG. 4.

Figure 6:
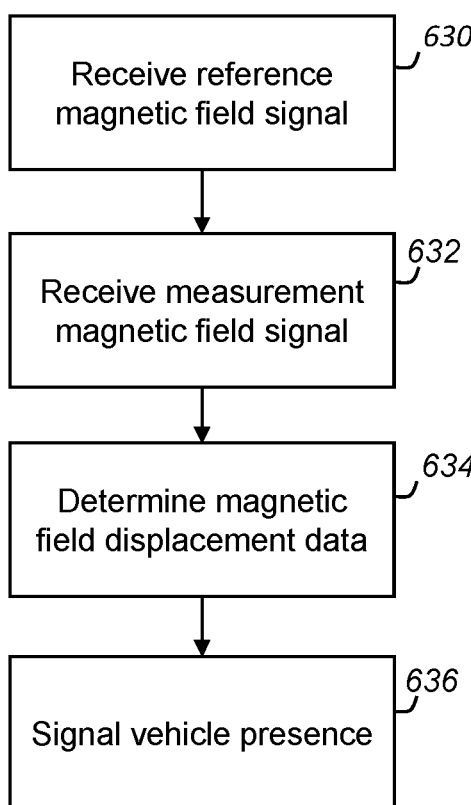
FIG. 6 illustrates a flow diagram for a method for sensing the proximity of a vehicle according to an embodiment of the present disclosure.

FIG. 6 illustrates a flow diagram for a method for sensing the proximity of a vehicle according to an embodiment of the present disclosure. The method may be a computer implemented method performed on a processor or a controller, such as the controllers described in relation to any of the systems disclosed herein.

A first step comprises receiving a reference magnetic field signal from a magnetometer. The reference magnetic field signal may comprise a background magnetic field signal. A second step 632 comprises receiving a measurement magnetic field signal from the magnetometer. A third step comprises determining magnetic field displacement data based on the measurement magnetic field signal and the reference magnetic field signal. For example, the magnetic field displacement data may comprise a difference or ratio between the measurement magnetic field signal and the reference magnetic field signal. A fourth step 636 comprises signalling the presence of a vehicle based on the magnetic field displacement signal. The method may comprise signalling the presence of a vehicle if the magnetic field displacement data exceeds one or more displacement thresholds. Signalling the presence of a vehicle may comprise activating an audible and or visible alert signal generator or may comprise transmitting a data signal to an external device such as a mobile computing system or a server.

The disclosed vehicle proximity sensor systems can detect when a FLT or other heavy vehicle is in proximity to a monitored location which can be fixed or mobile. By monitoring the magnetic field displacement over time an approximate speed of the vehicle can be determined which can be used to determine potential or actual hazards.

The invention claimed is:

1. A vehicle proximity sensor system comprising:
    a safety structure susceptible to vehicle collisions and comprising a magnetometer;
    an alert signal generator; and
    a controller configured to:
        receive a reference magnetic field signal from the magnetometer;
        receive a measurement magnetic field signal from the magnetometer;
        determine magnetic field displacement data based on the measurement magnetic field signal and the reference magnetic field signal; and
        signal a presence of a vehicle based on the magnetic field displacement data,
    wherein the controller is configured to signal the presence of the vehicle by activating the alert signal generator, the alert signal generator configured to alert a driver of the vehicle to a proximity of the vehicle to the safety structure.

2. The vehicle proximity sensor system of claim 1, wherein the controller is configured to signal the presence of a vehicle in response to the magnetic field displacement data exceeding one or more displacement thresholds.

3. The vehicle proximity sensor system of claim 1, wherein the controller is configured to signal the presence of the vehicle by activating the alert signal generator.

4. The vehicle proximity sensor system of claim 3, wherein the alert signal generator comprises an audible signal generator and/or a visible signal generator.

5. The vehicle proximity sensor system of claim 1, wherein the controller is configured to signal the presence of a vehicle by transmitting a data signal to an external device.

6. The vehicle proximity sensor system of claim 1, wherein the controller is configured to:
    receive a plurality of measurement magnetic field signals from the magnetometer over a time period and determine the magnetic field displacement data based on the plurality of magnetic field signals.

7. The vehicle proximity sensor system of claim 6, wherein the controller is configured to:
    determine one or more dynamic parameters of the vehicle based on the plurality of magnetic field displacement data; and
    signal the presence of a vehicle based on the one or more dynamic parameters.

8. The vehicle proximity sensor system of claim 6, wherein the controller is configured to:
    determine a trajectory of the vehicle based on the plurality of magnetic field displacement data; and
    signal the presence of the vehicle if at least a portion of the trajectory of the vehicle falls within a threshold range of the proximity sensor.

9. The vehicle proximity sensor system of claim 1, wherein:
    the controller is co-located with the magnetometer;
    the controller is coupled to the magnetometer via a network; or
    the controller comprises a plurality of processors distributed between being co-located with the magnetometer or coupled to the magnetometer via the network.

10. The vehicle proximity sensor system of claim 1, wherein the controller is further configured to:
    receive trigger signaling from a trigger sensor indicating an object within a sensing range of the vehicle proximity sensor system;
    selectively activate the magnetometer based on the trigger signaling such that it provides the measurement magnetic field signal to the controller;
    determine the magnetic field displacement data; and
    determine that the object is a vehicle based on the magnetic field displacement data.

11. The vehicle proximity sensor system of claim 10 comprising the trigger sensor.

12. The vehicle proximity sensor system of claim 11, wherein the trigger sensor comprises one or more of: an optical sensor, a mechanical sensor and a receiver.

13. The vehicle proximity sensor system of claim 10, wherein the trigger signaling is received from the object.

14. The vehicle proximity sensor system of claim 10, wherein the controller is configured to enable a sleep mode of the vehicle proximity sensor when the magnetic field displacement is less than a sleep threshold.

15. The vehicle proximity sensor system of claim 1, wherein the controller is configured to receive a plurality of reference magnetic field signals from the magnetometer and determine the magnetic field displacement based on the plurality of reference magnetic field signals.

16. The vehicle proximity sensor system of claim 15, wherein the vehicle proximity sensor system is associated with a magnetized structure and the controller is further configured to determine a condition of the magnetized structure based on the plurality of reference magnetic field signals.

17. The vehicle proximity sensor system of claim 1, wherein at least the magnetometer is positioned within the safety structure, the safety structure comprising any of: a safety barrier, a safety bollard, a safety rail, a post for a safety rail, a collision sensor or a component part thereof.

18. The vehicle proximity sensor system of claim 1, further comprising:
    a plurality of magnetometers, wherein each magnetometer is coupled to a corresponding transceiver; and
    a server configured to communicate with each of the plurality of magnetometers via the corresponding transceiver.

19. The vehicle proximity sensor system of claim 1, wherein the safety structure comprises a structure for protecting or segregating assets or pedestrians from vehicles or a structure for protecting or segregating pedestrians from hazard areas.

20. A computer implemented method for sensing a proximity of a vehicle, comprising:
    receiving a reference magnetic field signal from a magnetometer of a safety structure susceptible to vehicle collisions;
    receiving a measurement magnetic field signal from the magnetometer;

determining magnetic field displacement data based on the measurement magnetic field signal and the reference magnetic field signal; and signaling a presence of a vehicle based on the magnetic field displacement data by activating an alert signal generator for alerting a driver of the vehicle to the proximity of the vehicle to the safety structure.

\* \* \* \* \*